United States Patent [19]

Alameel et al.

[11] Patent Number: 4,881,792

[45] Date of Patent: Nov. 21, 1989

[54] SELF-ADJUSTING OPTICAL FIBER CONNECTOR ASSEMBLY

[75] Inventors: George M. Alameel, Duluth; Rodney W. Hammond, Norcross, both of Ga.

[73] Assignee: American Telephone and Telegraph Company, AT&T Bell Laboratories, Murray Hill, N.J.

[21] Appl. No.: 175,719

[22] Filed: Mar. 31, 1988

[51] Int. Cl.[4] .............................................. G02B 6/36
[52] U.S. Cl. ............................... 350/96.20; 350/96.21
[58] Field of Search ............... 350/96.20, 96.21, 96.22; 439/55, 64, 68, 246, 247, 248, 577

[56] References Cited

U.S. PATENT DOCUMENTS

| | | | |
|---|---|---|---|
| 3,091,748 | 5/1963 | Takes et al. | 339/65 |
| 3,094,364 | 6/1963 | Lingg | 339/64 |
| 3,894,782 | 7/1975 | Hug | 339/64 R |
| 4,167,303 | 9/1979 | Bowen et al. | 350/96.21 |
| 4,217,030 | 8/1980 | Howarth | 350/96.21 |
| 4,227,765 | 10/1980 | Neumann et al. | 339/143 R |
| 4,432,604 | 2/1984 | Schwab | 350/96.21 |
| 4,470,660 | 9/1984 | Hillegonds et al. | 350/96.21 |
| 4,580,862 | 4/1986 | Johnson | 339/64 R |
| 4,687,292 | 8/1987 | Krausse | 350/96.21 |
| 4,697,859 | 10/1987 | Fisher | 439/246 |
| 4,725,120 | 2/1988 | Parazygnat | 350/96.22 |
| 4,787,706 | 11/1988 | Cannon, Jr. et al. | 350/96.20 |

Primary Examiner—John D. Lee
Attorney, Agent, or Firm—Edward W. Somers

[57] ABSTRACT

A coupling (20) for backplane connections of an optical fiber arrangement facilitates superbly alignment of optical fibers notwithstanding blind insertion of a portion of the arrangement. The coupling arrangement includes a housing (70) which has a first end portion (52) and a second end portion (49) and which is mounted in an opening of a panel (32) such that it floats and is capable of three dimensional adjustive movement to facilitate alignment of plugs which terminate optical fibers and which are inserted into opposite ends of a sleeve (84) disposed in the housing. A longitudinal movement of the coupling is facilitated by a compression spring (102) which is disposed about the housing between the backplane and a retaining member (104). Advantageously, the second end portion of the housing is tapered inwardly to cause the plug (80) of a card (40) which is inserted blindly into the second end portion of the housing to cam against the entrance of the housing to cause the coupling to be repositioned in the panel opening. A dimensional ratio of a portion of the housing between the tapered second end portion and the sleeve cooperates with substantially frictionless washers (103-103) which engage ends of the spring to cause any movement of the coupling as the plug is inserted into its second end portion to be substantially translatory thereby insuring end face contact of the plugs to obtain a low loss, low reflection connection.

13 Claims, 5 Drawing Sheets

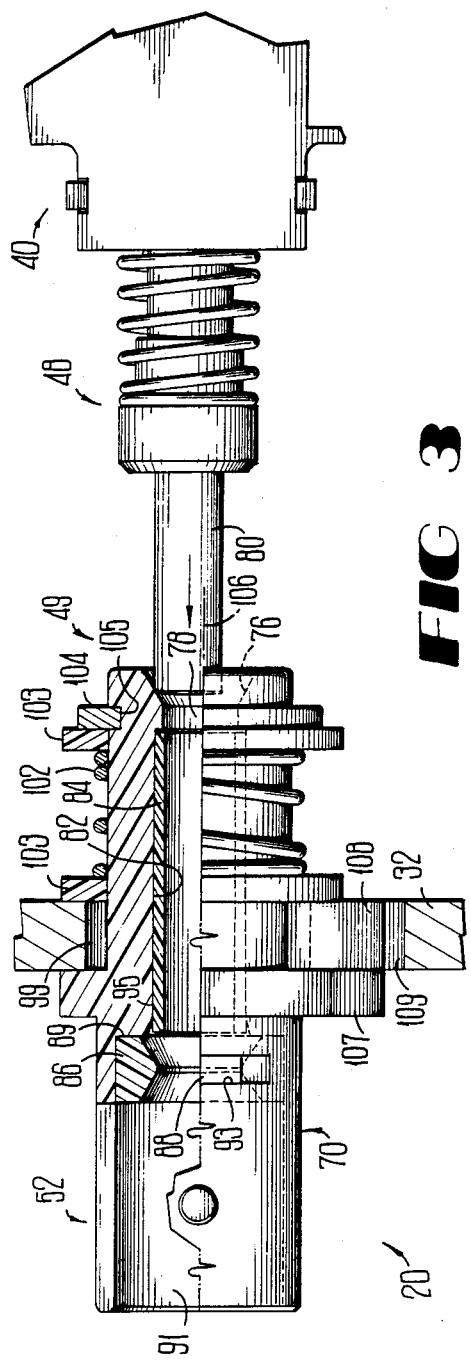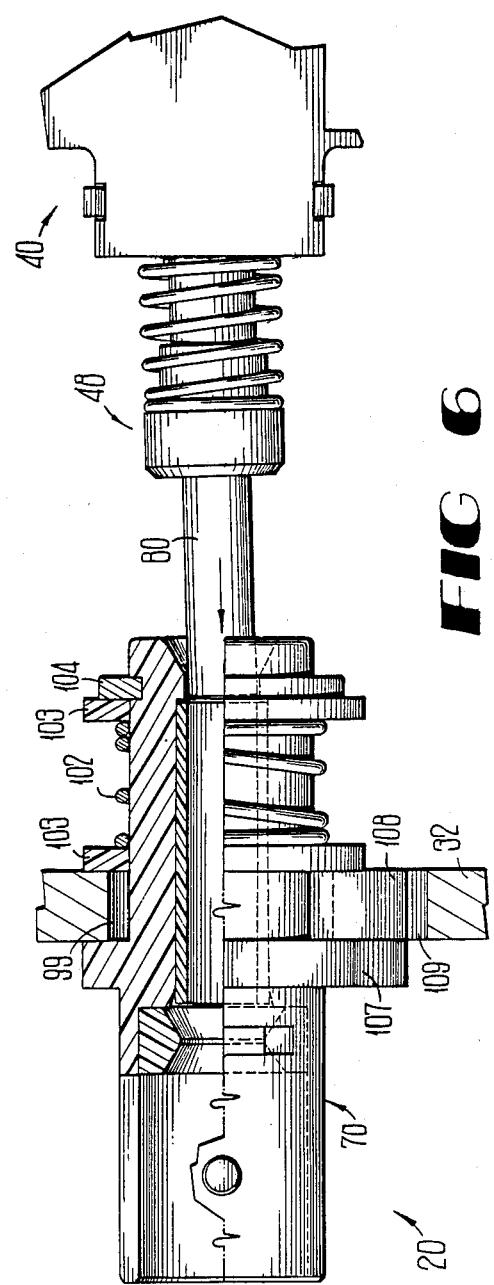

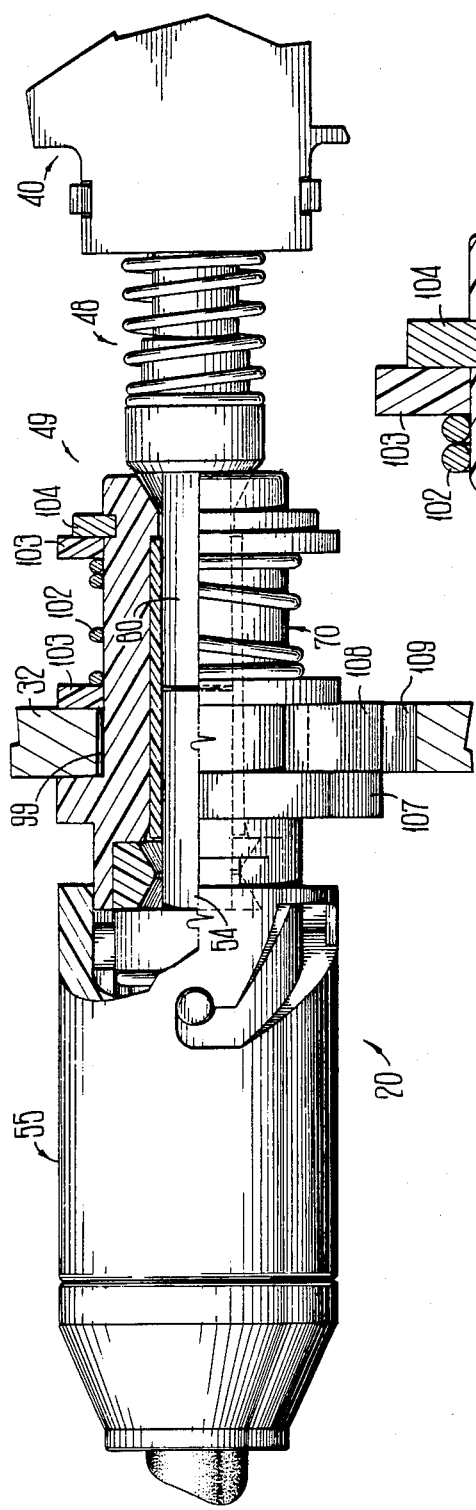
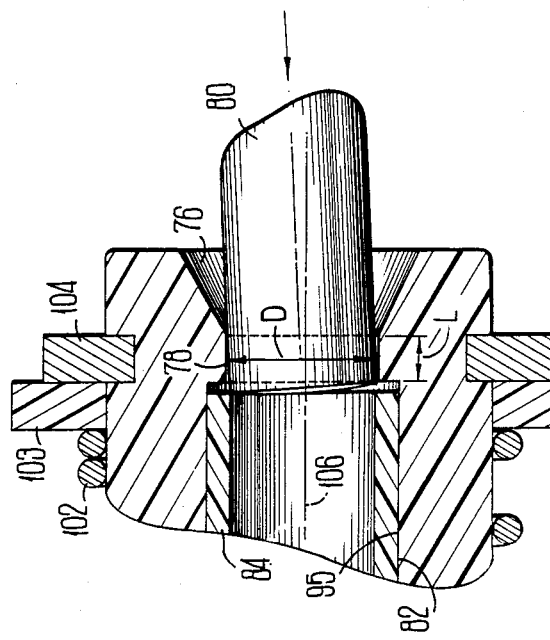
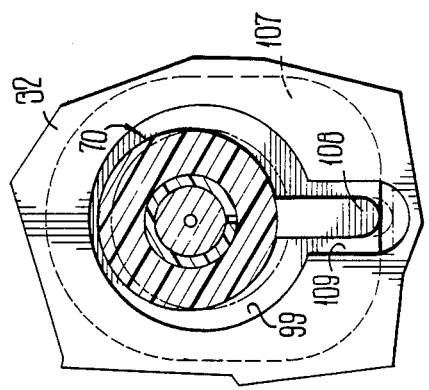
FIG. 7
FIG. 8
FIG. 5

SELF-ADJUSTING OPTICAL FIBER CONNECTOR ASSEMBLY

TECHNICAL FIELD

This invention relates to an optical fiber coupling. More particularly, it relates to an optical fiber backplane coupling which may be used in a local area network or in loop distribution plant.

BACKGROUND OF THE INVENTION

A local area network system or loop distribution plant is effective to connect each telephone customer to a central office through a transmission medium. Presently, the transmission medium commonly is a twisted pair of insulated copper conductors which, for most of its length, is disposed in a multipair cable.

In a typical loop plant, a main feeder cable connects the central office to an area to be served. Branch feeder cables extend from the main cable to designated areas. Each branch cable connects to a plurality of distribution cables that extend service to a particular customer area. A distribution service or drop cable connects a distribution cable to each customer premises.

The loop plant has evolved as new materials, methods and plant concepts were developed to provide reliable telephone service at a reasonable cost. Loop plant must be inexpensive to install and maintain, should require a relatively small amount of physical space, and be readily accessible to accommodate changes in service and in customers.

Today, efforts are under way to cause the loop to become one in which optical fiber plays a predominant role. As is known, optical fiber interface electronic devices which are required for an optical fiber loop are not yet generally available. When such devices become available, loop architecture and media also should be available so that devices can be connected immediately into the loop. Accordingly, it becomes important to provide a system which will provide service from those optical devices now in development to customer premises.

Such a system has been developed. The cornerstone of the system insofar as a particular area is concerned is a distribution center which is referred to as a remote terminal. For the loop distribution plant, each remote terminal is designed to provide service to a plurality of distribution points. Optical fiber is to be extended from optical units of the remote terminal to an interconnection portion whereat it is connected to runs which extend to branch-outs. At each branch-out, an incoming optical fiber is connected, for example, by a prealigned rotary splice shown in U.S. Pat. No. 4,691,986 which issued on Sept. 9, 1987 in the names of J. A. Aberson, et al. to a distribution drop. From a distribution drop, service is provided by a drop cable to each of a plurality of homes in a subdivision, for example.

Inside the remote terminal are a number of frames, with each frame adapted to receive a plurality of cards. Each card which includes a laser, a splitter and a detector, for example, is adapted to be connected through a coupling which is mounted in a panel to a jumper cable which extends to the interconnection portion of the remote terminal. Such a panel is referred to commonly as a backplane. For this purpose, the card may be provided with a modified ST ® connector, for example. For the loop distribution plant as now envisioned, not only is such a backplane provided at the remote terminal, but also one would be found at each home.

A jumper which is terminated at each of its ends with an ST ® connector, for example, extends from an opposite or outgoing side of the backplane coupling to an optical connection portion of the remote terminal. The optical connection portion allows interconnections and/or cross connections of a connector end of each jumper cable to an optical fiber of a cable which extends outwradly to the branch-outs of the loop plant. The connections from the jumper cables to the optical fibers of the outgoing cable may be made, for example, by means of a fanout arrangement shown in U.S. Pat. No. 4,305,642 which issued on Dec. 15, 1981 in the names of L. B. Bloodworth, et al.

The outgoing cable from the interconnection portion of the remote terminal extends to a primary closure. From the primary closure, smaller cables extend to intermediate closures and thence to drop closures such as those disclosed and claimed in application Ser. No. 155,194 which was filed on Feb. 12, 1988 in the names of R. R. Ross and I. Vedejs now U.S. Pat. No. 4,820,007. Each of the drop closures is adapted to provide service to a plurality of customer premises.

It is anticipated that each home will be provided with a service unit mounted on the exterior of the home. Each of these units will include a panel-mounted backplane coupling adapted to receive an ST ® connector, for example, at one end thereof. An opposite end of the backplane coupling, which may be the same as that coupling which is mounted in the remote terminal, is adapted to receive a modified ST ® connector which terminates a lead from a card-mounted splitter.

One of the problems in a loop arrangement such as that just described relates to the mounting of the cards within the remote terminal. For example, the center-to-center spacing may be as low as 0.441 inch. Each card must be capable of being inserted repeatedly to provide a low-loss, low reflection optical connection, and yet there is very little room in which a craftsman can make a connection. Obviously, the sought-after coupling also must be rugged and must insure that alignment of the ST ® connectors occurs albeit accomplished in the confines of a congested backplane.

Typically, each card is connected to the backplane coupling by a craftsman who causes the card to be moved into a slotted opening in a frame. The card is caused to be moved toward the coupling until the modified ST ® connector at its leading end is inserted into one end of its associated coupling and then into one end of an alignment sleeve which is disposed within the coupling.

Considering the space involved, it should be readily apparent that the connector insertion is a blind one, that is the craftsman cannot view directly the coupling as the card connector is moved toward it. Blind insertion raises two problems. First, a physical insertion must take place, otherwise the end face of the connector could be damaged, and/or no optical connection will take place. Also, a frequent happening is an excessively angled insertion of the connector plug into the coupling which may cause the sleeve to break. Further, the canting of the connector with respect to the sleeve results in misalignment with the connector plug at an opposite end of the coupling as well as excessive reflection.

Connective arrangements in the prior art have not been altogether successful in meeting the needs identified hereinbefore. Some have included sleeves mounted in the backplane, but the frequency of broken sleeves upon insertion of the cards has been high. In others, alignment of the optical fibers has suffered, resulting in unacceptably high losses.

Seemingly, the prior art has not recognized nor addressed this problem. And yet it must be solved for reliable, low loss optical transmission to be brought to the home. What is sought is a coupling arrangement which facilitates the connection of a card, on which are mounted optical devices, to an optical fiber. Obviously, the coupling arrangement must be relatively inexpensive and easily installed. Further, it must facilitate the interconnection with low probability of sleeve breakage of connector fiber damage and must result in low reflection and low insertion loss.

SUMMARY OF THE INVENTION

The foregoing problems of the prior art have been overcome with the coupling of this invention. The coupling includes a housing comprising a first end portion and a second end portion with a flange being disposed between the first and second end portions. The first end portion is adapted to receive a plug which terminates an optical fiber. A sleeve is disposed in the housing and is recessed therewithin. The sleeve is adapted to receive in each of its ends a plug which terminates an optical fiber. Also, the coupling has an entrance to the second end portion thereof which is tapered from a large diameter portion at the entrance to a small diameter adacent tothe sleeve. Further, the housing is mounted in a support panel in a manner which permits movement of the housing.

Mounting facilities are provided for supporting the housing in the panel in such a manner as to permit movement in any one or more of three dimensions as a plug is inserted into the second end portion of the housing. Also, the mounting facilities cause the housing to be biased toward its second end portion and the flange to become seated in engagement with the panel. The mounting facilities are effective to cause insertion of the plug into the second end portion of the housing to be accomplished in a manner so that the plug at worst engages the tapred entrance thereby avoiding damage to the end face of the plug, particularly to the optical fiber terminated therein. Also, the mounting facilities are effective to minimize any turning movement of the coupling about an axis transverse to its longitudinal axis and to cause any movement of the coupling during insertion of a plug into the second end portion to be substantially translatory with respect to its longitudinal axis.

The just-described arrangement is advantageous in that as a plug end of a card, for example, is inserted into the housing, the plug is cammed by the tapered wall into the sleeve. Also, the mounting of the housing allows the housing to be moved by the plug to accommodate the insertion. Advantageously, substantially all the movement of the coupling is translatory with respect to the longitudinal axis.

BRIEF DESCRIPTION OF THE DRAWING

Other features of the present invention will be more readily understood from the following detailed description of specific embodiments thereof when read in conjunction with the accompanying drawings, in which:

FIG. 3 is an elevational view in section of the coupling of this invention;

FIG. 5 is an end elevational view of an opening in a panel in which is supported the coupling;

FIG. 6 is an elevational view of the coupling as a card plug is being inserted into proximate engagement with a sleeve thereof;

FIG. 7 is an enlarged view of a portion of the coupling and shows a slight canting of a plug as it is moved past a flared entrance toward the coupling sleeve; and FIG. 8 is an elevational view of the coupling of FIG. 3 after a card plug has been inserted into one end thereof and another plug which terminates an optical fiber has been inserted into the other end thereof.

DETAILED DESCRIPTION

Figure 1:
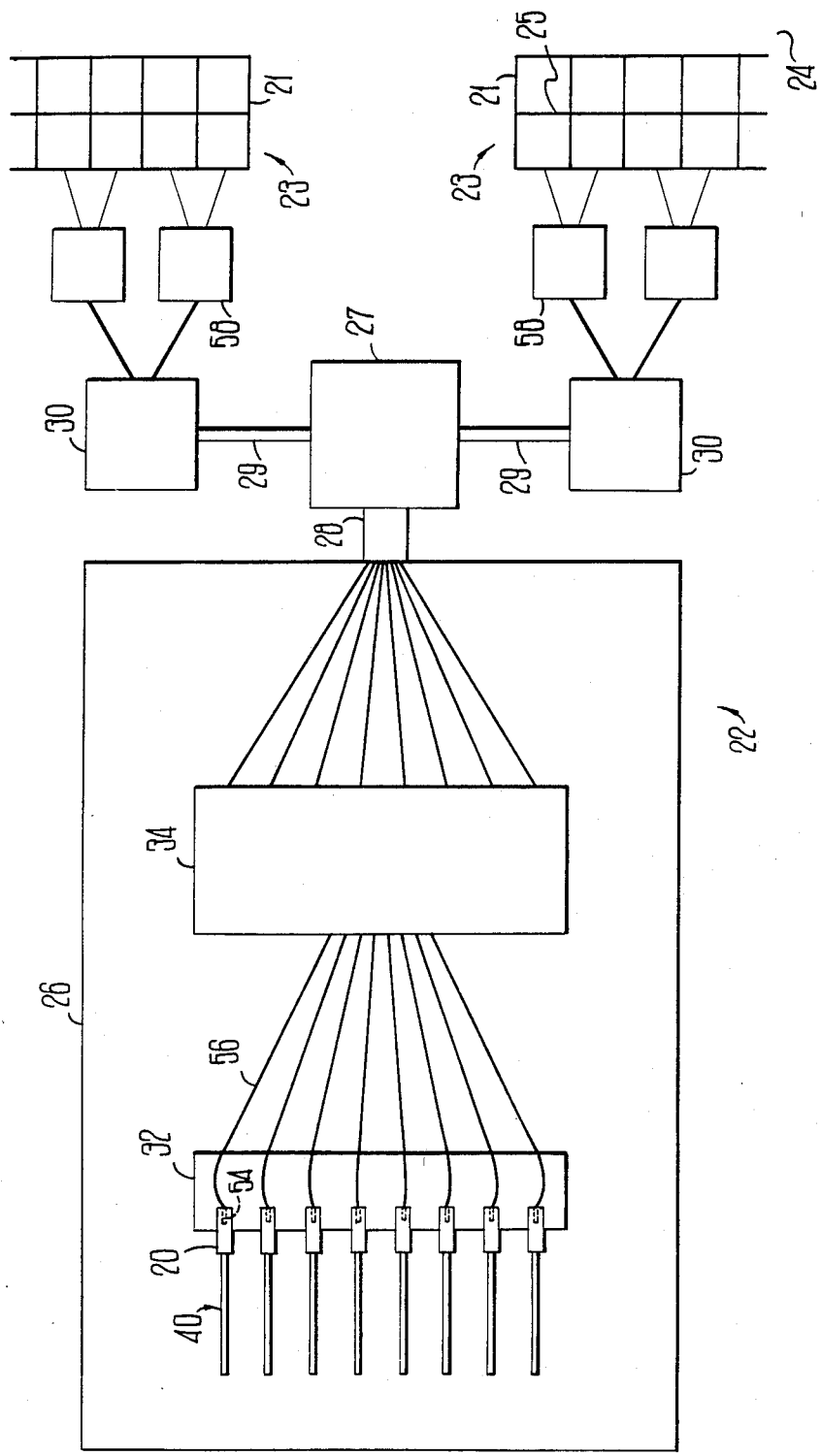
FIG. 1 is a schematic view of a system in which the coupling of this invention may be used.

Referring now to FIG. 1, there is shown a schematic view of a distribution and service cable system which includes an optical fiber coupling 20 of this invention. This system, which is designated generally by the numeral 22, is adapted to provide optical fiber cable service to customers' premises. It is intended to be used instead of or to replace prior art metallic conductor communications distribution systems.

For simplicity, an area has been subdivided into a plurality of lots of customer using units 21—21 with a plurality of lots comprising a unit 23. Front lot lines of opposing lots are spaced apart by a roadway 24. Also, as can be seen in FIG. 1, a plurality of units 23—23 are separated from another plurality by a right-of-way designated with a numeral 25.

The distribution system includes a remote terminal and/or serving area interface 26. From the remote terminal 26 along a right-of-way to a branch-out 27 extends a cable 28 adapted to provide communications service for a plurality of the units 23—23. In order to accomplish this, a plurality of distribution cable segments 29—29 extend from each branch-out to a plurality of secondary closures 30—30.

Figure 2:
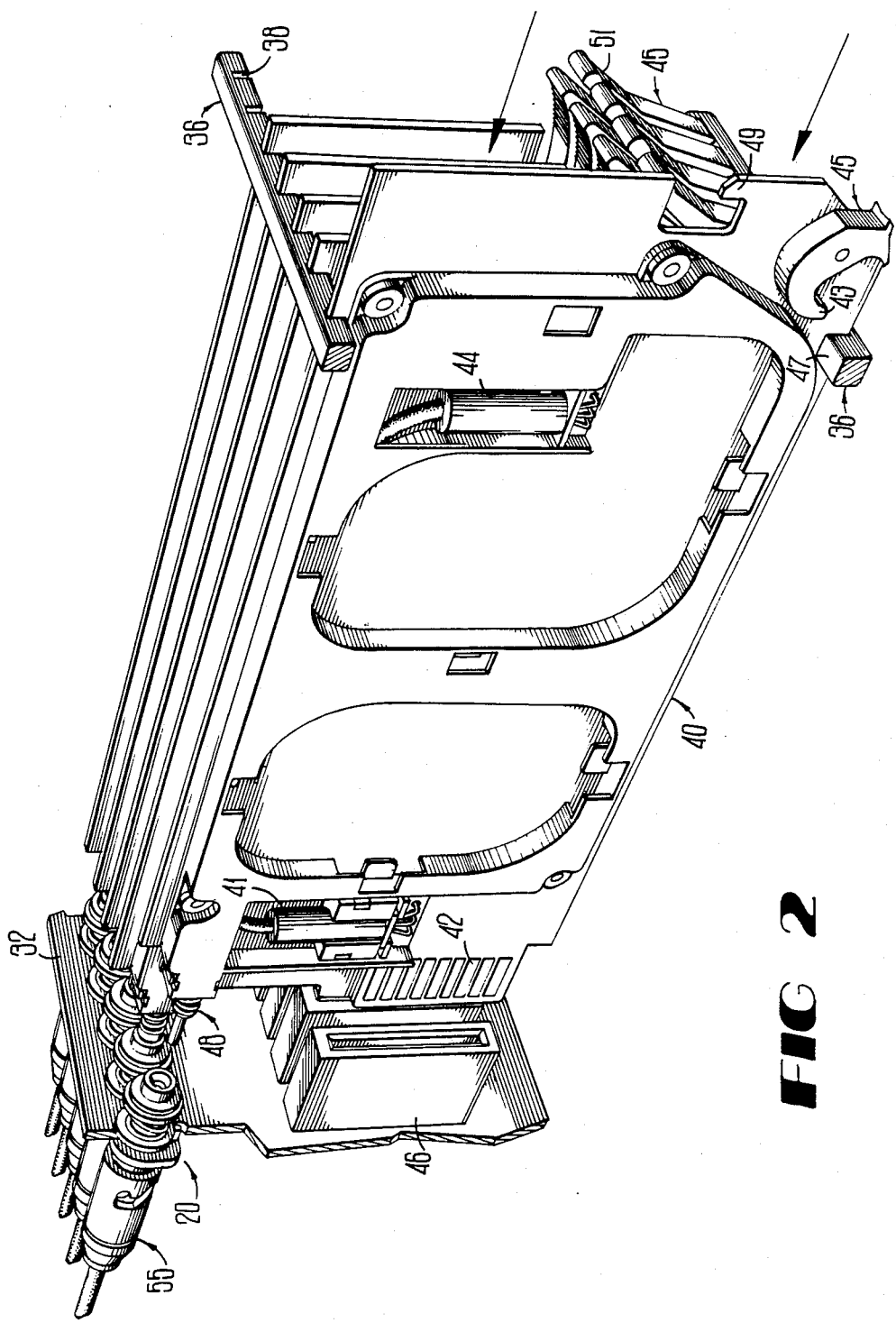
FIG. 2 is a perspective view of a connective arrangement which includes a coupling of this invention.

Each of the remote terminals 26—26 includes a connecting panel 32 and an interconnection portion 34. A frame 36 (see FIG. 2) to one side of the connecting panel or backplane 32 is provided with a plurality of slots 38—38, each adapted to receive a card 40. Each card is provided with a laser 41, detector 44 and splitter (not shown) with the splitter connected to a plug or ferrule, as it is often called, of a connector 48 such as a modified ST ® connector. An ST ® connector is disclosed in U.S. Pat. No. 4,634,214 which issued on Jan. 6, 1987 in the names of T. C. Cannon, Jr., et al. Each card 40 includes a plurality of electrical contacts 42—42 which are adapted to be received in a connector 46 which is connected through other equipment (not shown) to a central office.

Facilities are provided for securing each card 40 in the frame 36. For example, as each card 40 is moved into a slot 38, an installer moves a pivotally mounted member 45 in a counterclockwise direction as viewed in FIG. 2 to cause a portion 43 to engage a portion 47 of the frame 36. Also, this causes a latch portion (not shown) to latch to a keeper 49 of the card. To withdraw the card 40 from the frame, the installer compresses furcations of a bifurcated portion 51 to release the latch portion and moves pivotally the portion 43 from locking engagement with the portion 47 of the frame.

The connector 48 of each card 40 is adapted to be inserted into one end 49 of the coupling 20 (see FIGS. 3 and 4) of this invention which also is referred to herein as the backplane coupling and which is mounted on the panel 32. An opposite end 52 of the backplane coupling 20 is adapted to receive a plug 54 of an ST ® connector 55, for example, which terminates one end of a jumper 56 (see FIG. 1). The other end of the jumper 56 also may be terminated with an ST ® connector which is received on one portion of the interconnection portion 34 of the remote terminal 26. Optical fibers of the cable 28 are terminated in another portion of the interconnection portion 34 of the remote terminal 26 and then connected to selected ones of the terminated jumper ends.

The cable 28 is routed to the primary closure or branch-out 27 from which the smaller cables 29—29 extend to the closures 30—30. Each closure 30 is adapted to be connected to a drop closure 58 which provides service to two customer units 21—21 which may be homes, for example. At each customer unit, an enclosure attached to the outside wall houses another card 40 which mounts to another backplane coupling 20. Another end of the coupling receives a connector which terminates an end of a service cable which extends from the drop closure 58 to the customer unit.

Figure 4:
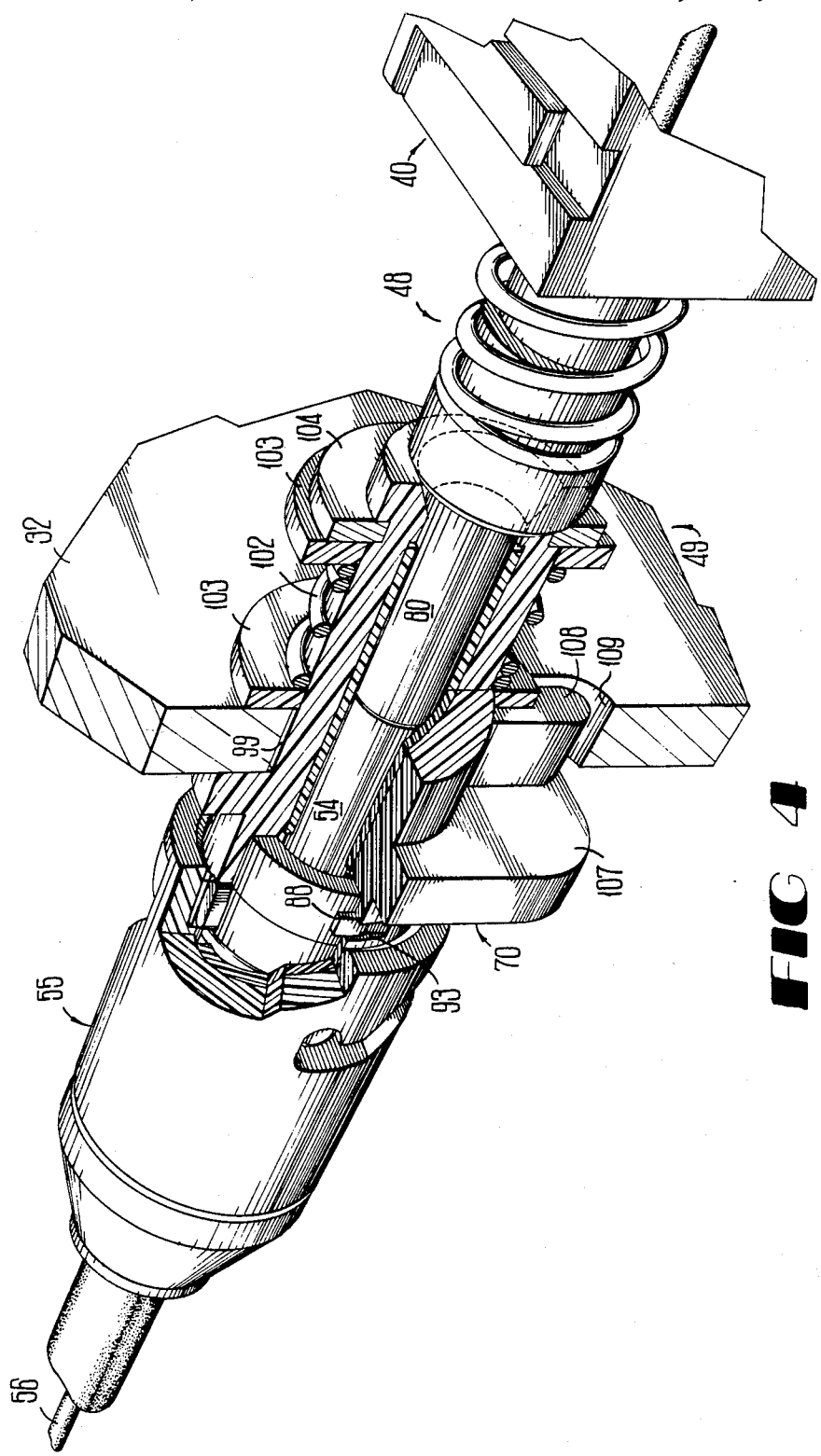
FIG. 4 is a perspective view of the coupling as mounted in a panel with portions thereof broken away for purposes of clarity and with plugs inserted into a sleeve thereof.

Going now to FIGS. 3 and 4, there is shown in detail the backplane coupling 20 of this invention. The coupling 20 is adapted to couple together two cylindrical plug type connectors such as, for example, the well known ST ® connector. It should be understood that the coupling 20 could be used to couple together other cylindrical plug connectors as well.

The coupling 20 includes a housing 70 which includes the card end 49 and the jumper end 52. In order to facilitate inserting the card into the end 49, the housing 70 includes a flared opening 76 which communicates with a cylindrical bore 78. The cylindrical bore 78 has a diameter which is slightly greater than that of a plug 80 of the connector 48 to be received therein.

The cylindrical bore 78 opens to an enlarged passageway 82 of the housing in which is received a cylindrical alignment sleeve 84. The alignment sleeve 84 is adapted to receive a connector plug in each end and to cause the end portions thereof to be aligned. Accordingly, the transverse cross section of the sleeve as defined by its inner diameter is such as to provide an interference fit with the plugs to be received therein.

A split retaining ring 86 having diametrically opposed ears 88—88 (see FIG. 4) is seated in engagement with an annular shoulder 89 formed between the passageway 82 and a cavity 91. As the split retaining ring is moved along the cavity 91 and into engagement with the shoulder 89, the ears 88—88 of the ring, which had been compressed, spring outwardly into openings 93—93 in the housing to lock the sleeve within the housing. The ring 86 is sized so that it projects inwardly beyond a surface 95 which defines the passageway 82 and hence prevents the sleeve from being moved inadvertently out of the housing. However, the opening in the ring is equal substantially to that of the sleeve to permit a plug of another connector, which in the preferred embodiment is connected to a jumper cable 56, to be inserted As can be seen, the coupling 20 is mounted in the opening 99 of the backplane panel 32. On the card end of the housing 70 of the coupling 20 is disposed a compression spring 102 which is held thereon by a retaining ring 104 seated in a groove 105 of the housing. The spring 102 causes a flange 107 of the coupling to be held in engagement in the panel 32.

Also, as can be seen in the drawing, each end of the spring 102 engages a washer 103 which is made of a material which has a relatively low coefficient of friction with respect to the material of the spring 102. If the spring 102 is made of stainless steel, for example, the washers 103—103 preferably are made of an acetal material such as, for example, DELRIN ® resin which has a relatively low coefficient of friction relative to that of stainless steel. DELRIN is a registered trademark of the E.I. DuPont de Nemours Company. One of the washers 103—103 is disposed between the spring 102 and the panel 32 and one between the spring and the retaining ring 104.

The washers 103—103 are advantageous in causing the connection through the coupling to be one which is relatively low loss, low reflection. Without the washers 103—103 or with washers having a high coefficient of friction, insertion of the plug 80 could result in an undue amount of turning of the coupling 20 about an axis transverse to a longitudinal axis 106 of the coupling. Advantageously, the washers 103—103 are able readily to slide with respect to the spring 102 and thereby help to cause any movement of the coupling to be substantially translatory.

Advantageously, the opening 99 through the backplane panel 32 is sized to be about 0.060 inch larger than the housing (see FIG. 5) thereby permitting movement of the housing of 0.060 inch, for example, in each of two directions. The disposition of the spring 102 about the housing 70 allows a third dimensional movement of the housing in a direction axially of the longitudinal axis of the housing. In a preferred embodiment, the spring is such as to allow an axial movement of about 0.060 inch.

As is well known, when an ST ® connector plug is inserted into a housing and sleeve, it must be turned to lock pins of the plug connector body to the sleeve housing. To prevent turning of the coupling 20 in the panel 32, the housing is provided with a longitudinally extending key 108 (see FIG. 5) that is received in a slot 109 extending radially from the oversize opening 99 in the panel.

As mentioned earlier herein, the insertion of the card plug into the backplane coupling is a blind one. With so many cards to be mounted on the couplings 20—20 in the panel 32 and with the center-to-center spacing therebetween being only about 0.441 inch, provisions must be made to facilitate such insertions and to prevent damage to the coupling sleeve.

Provisions of the backplane coupling 20 of this invention facilitate card plug insertion and prevent damage during each insertion. First, the entrance to the card end 49 of the coupling housing 70 is flared. Further, the tolerances of the card and of the coupling and its mounting are such that, at worst, the plug 80 if not aligned with the sleeve opening upon insertion of the card engages the flared portion 76 of the coupling entrance (see FIG. 3). As a result, when the card plug 80 is inserted, the plug cams against the flared wall eliminating the possibility of damage to the optical fiber which terminates in an end face of the plug.

Also, because the card 40 is moved slidably along one of the guide slots 38—38 in the panel frame 36, the camming of the card plug against this flared wall applies forces to the coupling. Because of the oversize opening 99 in the panel 32 in which the housing 70 is received, the housing is able to be moved by the card 40 to accommodate the plug 80 of the card. Further, the spring mounting of the housing 70 allows longitudinal movement of the housing as the plug 80 is being inserted.

The coupling 20 is configured to minimize canting of the plug 80 as the plug is inserted therwithin (see FIGS. 6 and 7). The length of the cylindrical bore 78 longitudinally of the housing 70 is designated L and the diameter of the bore is designated D. It has been found that by controlling the ratio of D/L, the degree of canting of the plug 80 of the card 40 that is inserted into the housing 70 is controlled. Preferably, the ratio D/L is about 2.5.

Further, the arrangement of the spring 102 and the substantially frictionless washers 103—103 cooperates with the dimensional ratio of D/L to cause any movement of the coupling 20 as a plug is inserted into its card end to be substantially translatory. Advantageously, from the standpoint of a low loss, low reflection connection, any turning of the coupling 20 as the card plug is inserted is about 1° or less. As a result, reflection and insertion loss are minimized. Also, the probability of sleeve damage during insertion of the plug becomes substantially zero.

The card plug 80 may be inserted into the sleeve 84 either before or after a plug which terminates a jumper 56, for example, is inserted into the opposite end 52 of the housing. After both plugs have been inserted into the sleeve 84, the end faces of the plugs engage each other (see FIGS. 4 and 8).

It should be understood that the above-described arrangements are simply illustrative of the invention. Other arrangements may be devised by those skilled in the art which will embody the principles of the invention and fall within the scope and spirit thereof.

What is claimed is:

1. A coupling which is adapted to be mounted in a panel, said coupling comprising:
   a housing comprising first and second end portions, each said end portion being adapted to receive a plug which terminates an optical fiber;
   a sleeve which is disposed in said housing, recessed from at least the second end portion thereof and adapted to receive in each end portion thereof a plug which terminates an optical fiber, said housing having an entrance to said second end portion thereof which is tapered from a large diameter portion at the entrance to a small diameter portion adjacent to said sleeve with said small diameter portion having a transverse cross section which is equal at least to the transverse cross-section defined by an inner diameter of said sleeve; and
   mounting means for supporting said housing in an opening of a panel in such a manner as to permit movement in any one or more of three dimensions as a plug is inserted into said second end portion of said housing, said mounting means cooperating with a diameter-to-length ratio of the small diameter portion of said housing which is adjacent to said sleeve to minimize any turning movement of said coupling about an axis transverse to its longitudinal axis and cause any movement of said coupling during insertion of a plug into said second end portion to be substantially translatory with respect to the longitudinal axis.

2. The coupling of claim 1, wherein said sleeve is held within said housing by a retaining ring which is disposed adjacent to said first end of said housing.

3. The coupling of claim 1, wherein said mounting means includes a flange circumscribing said housing between said first and second end portion thereof, said flange being adapted to engage a panel having an opening into which said coupling is inserted.

4. The coupling of claim 3, wherein said coupling is adapted to be mounted in a panel with said coupling extending through an opening in the panel, said coupling further including energy storage means which is disposed about a portion of said coupling between the panel and said second end portion of said coupling and retaining means attached to said coupling adjacent to said second end portion thereof, said energy storage means being effective to bias said flange of said coupling into engagement with said panel and allowing for a predetermined movement of said coupling in a direction along the longitudinal axis of said coupling as a plug which terminates an optical fiber is inserted into said second end portion of said housing.

5. The coupling of claim 4, wherein said energy storage means comprises a spring which is disposed concentrically about said housing and said mounting means includes two annular members, one of which is disposed between said spring and the panel and the other between said spring and said retaining means, said annular members being of a material which has a relatively low coefficient of friction relative to that of said spring.

6. A coupling arrangement adapted to receive in a first end portion thereof a plug which terminates an optical fiber and in the other end portion thereof a plug which terminates a card to which said fiber is to be connected, said arrangement including a panel having an opening therethrough, and a coupling as set forth in claim 1 extending through said opening in said panel, said opening in said panel being larger than a transverse cross section of said coupling so that as a card plug is inserted into said second end portion of said coupling, the card plug if non-aligned with said sleeve will cam against a wall wich defines said tapeed end of said second end portion of said housing and cause said coupling to become repositioned within said opening in said panel to cause said sleeve to become aligned with the card plug.

7. The optical fiber coupling arrangement of claim 6, wherein said mounting means includes a spring which is disposed about a portion of said housing between the panel and a retaining member adjacent to said second end portion of said housing, said coupling including two annular members each of which engages an end of said spring and which have a relatively low coefficient of friction relative to the material of said spring, the application of forces to said coupling causing said spring to be compressed and said coupling to be moved longitudinally within said opening in said panel.

8. The coupling of claim 7, wherein said panel includes a slot which opens to said opening in said panel, and said coupling including a longitudinally extending key which is adapted to be received in said slot when said coupling is mounted in said opening to prevent unintended turning of said coupling in said opening.

9. The coupling of claim 7, wherein said small diameter portion of said housing includes a cylindrical bore disposed between said tapered entrance and said sleeve, the transverse cross section of said cylindrical bore being equal at least to the transverse cross section defined by the inner diameter of said sleeve, and the ratio of the diameter of said cylindrical bore to the length of the bore being controlled to cooperate with the annular members which are made of a material having a coefficient of friction which is relatively low relative to that of the spring to limit any canting of the card plug should the card plug not be aligned with the sleeve when the card plug is inserted into the second end portion of the housing.

10. An arrangement for providing signals between a central office and an interconnection point in a local area network, said arrangement comprising;

a plurality of cards each having at least one optical component mounted thereon and having a plug extending from one end thereof, said plug terminating an optical fiber which extends from a component on said card;

a plurality of guideways each being adapted to receive a card;

a panel having a plurality of openings therein, each of said openings being aligned with one of said guideways for one of said cards;

a plurality of couplings each of which is mounted in an associated one of said openings in said panel and destined to be associated with one of said cards, each of said couplings comprising;

a housing comprising a first end portion and a second end portion with a flange being disposed between said first and second portions, each said end portion being adapted to receive a plug which terminates an optical fiber and said flange adapted to engage the panel having an opening into which said coupling is inserted;

a sleeve which is disposed in said housing, recessed from each end portion thereof and adapted to receive in each end thereof a plug which terminates an optical fiber, said housing having an entrance to said second end portion thereof which is tapered from a large diameter portion at the entrance to a small diameter portion adjacent to said sleeve with said small diameter portion having a transverse cross section which is equal at least to the transverse cross-section defined by an inner diameter of the sleeve; and mounting means for supporting said housing in the panel in such a manner as to permit movement in any one or more of three dimensions as a plug is inserted into said second end portion of said housing, said mounting means cooperating with the diameter-to-length ratio of the small diameter portion to minimize any turning movement of said coupling about an axis transverse to its longitudinal axis and cause any movement of said coupling during insertion of a plug into said second end portion to be substantially translatory with respect to the longitudinal axis;

each said opening in said panel being larger than a transverse cross section of said coupling disposed therein so that said coupling can be repositioned in its associated opening;

the arrangement being such that when a card is moved along a guideway with the plug of the card being moved into said coupling, said plug will engage at least the tapered entrance to the opening of the housing into which it is to be inserted; and a plurality of jumper cables, each adapted to be connected to one of said cards, each of said jumper cables being terminated with a plug which is received in a first end portion of one of said couplings.

11. The arrangement of claim 10, wherein the card plug if nonaligned with said sleeve will cam against a wall which defines the tapered entrance of said second end portion and cause said coupling to become repositioned within said opening in said panel to cause said sleeve to become aligned with the card plug.

12. The arrangement of claim 10, wherein said mounting means includes a spring which is disposed concentrically about said housing between the panel and a retaining ring adjacent to said second end portion of said housing and further includes two washers, one of which is disposed between said spring and the panel and the other between said spring and said retaining ring, said washers being of a material which has a relatively low coefficient of friction relative to that of said spring.

13. The arrangement of claim 12, wherein said small diameter portion of the housing includes a cylindrical bore disposed between said tapered entrance and said sleeve, the transverse cross section of said cylindrical bore being at least equal to that defined by the inner diameter of said sleeve, and the ratio of the diameter of the bore to the length of said cylindrical bore being controlled to cooperate with the washers which are made of a relatively low coefficient friction material to limit any canting of the card plug should the card plug not be aligned with the sleeve when the card plug is inserted into the second end portion of the housing.

* * * * *